Oct. 11, 1938.   C. RUNYAN   2,132,580
DIRIGIBLE TRAILER
Filed June 18, 1937   2 Sheets-Sheet 1

Inventor
Charles Runyan
By Clarence A. O'Brien
Hyman Berman
Attorneys

Oct. 11, 1938.   C. RUNYAN   2,132,580
DIRIGIBLE TRAILER
Filed June 18, 1937    2 Sheets-Sheet 2

Inventor
Charles Runyan

By Clarence A. O'Brien
Hyman Berman
Attorneys

Patented Oct. 11, 1938

2,132,580

UNITED STATES PATENT OFFICE 2,132,580

DIRIGIBLE TRAILER

Charles Runyan, Great Meadows, N. J.

Application June 18, 1937, Serial No. 148,994

3 Claims. (Cl. 280—104)

My invention relates generally to automotive trailers, and particularly to a trailer having a dirigible truck assembly including a coordinated pair of axle members each of which has a pair of wheels, the steering of which is under the operative control of steering coordinating means on the trailer or on the tractor vehicle, and an important object of my invention is to provide arrangements of the character indicated which more efficiently and safely provide for the steering of the trailer.

Other important objects of my invention will be apparent from a reading of the following description taken in connection with the drawings, wherein for purposes of illustration I have shown a preferred embodiment of my invention.

The present application is a continuation in part of my application Serial No. 69,229, filed March 16, 1936, and patented February 9, 1937, No. 2,069,928, and is intended to be operated by the steering arm thereof, the present invention being concerned particularly with the rear dirigible truck of the trailer.

In the drawings:—

Figure 1:
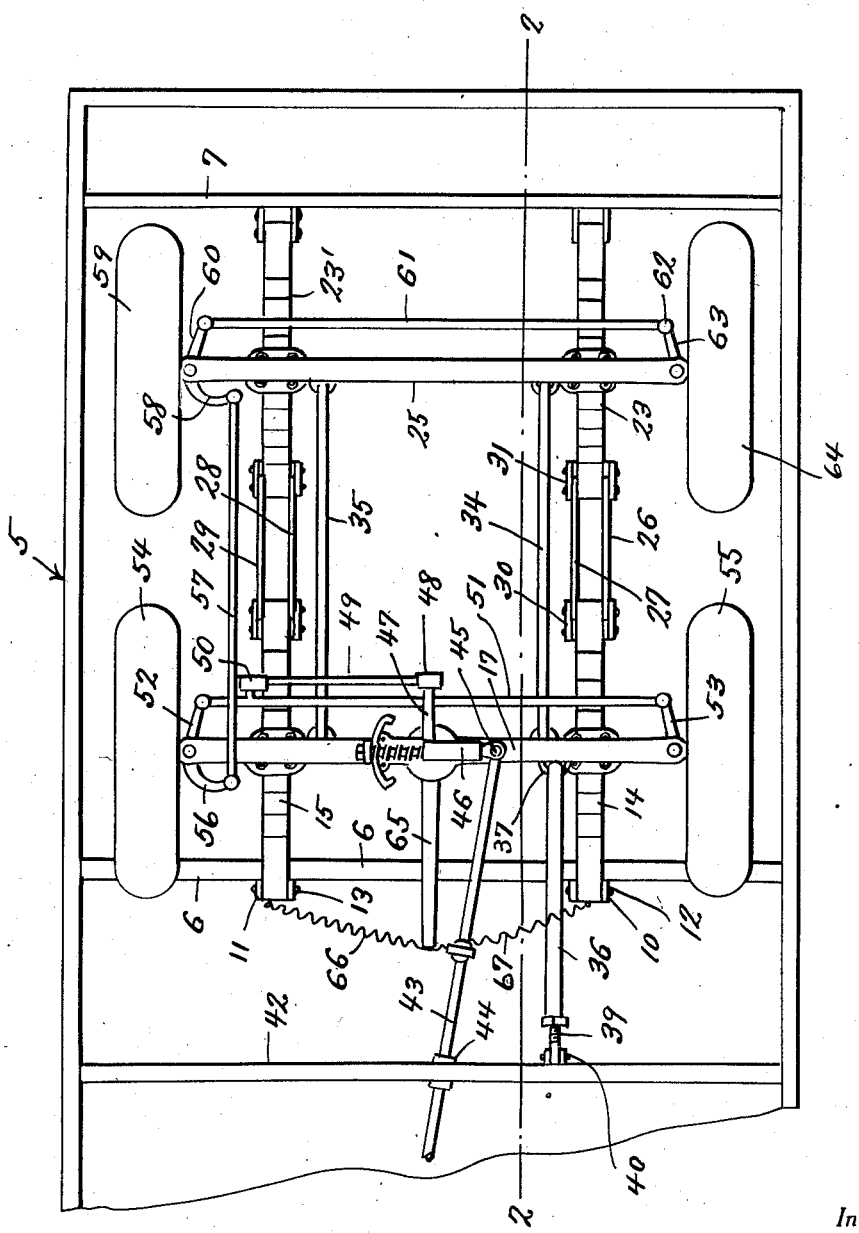
Figure 1 is a general bottom plan view of the embodiment.

Referring in detail to the drawings, the numeral 5 generally designates the rear part of the trailer chassis frame which is provided with a front cross member 6 and a rear cross member 7. The front cross member 6 has two depending blocks 8 whose lower ends are in the form of clevises 10 and 11 carrying pivots 12 and 13 on which the front ends of the front leaf springs 14 and 15 are hung, the longitudinal center of these springs being connected by U-bolts or other suitable structure 16 to respective end portions of the I-beam axle 17.

Attached to and depending from the rear cross member 7 are similar blocks 19 which have pairs of spaced toggle links 21 with their upper ends pivoted to the lower ends of the blocks and with their lower ends pivoted as indicated by the numeral 22 to the rear end of the corresponding rear leaf spring 23 which has its center connected by U-bolts or the like 24 to the rear I-beam axle 25.

Figure 2:
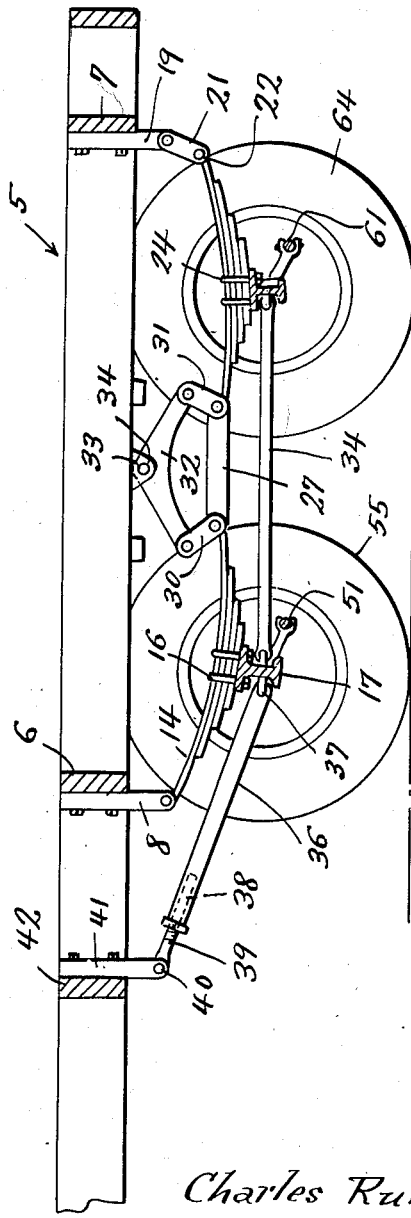
Figure 2 is a longitudinal vertical sectional view taken through Figure 1 approximately on the line 2—2.

Longitudinal links 26 and 27 for the springs 14 and 23 and 28 and 29 for the springs 15 and 23' are pivoted to the front end of the springs and outside of these are pivoted on the same pivots short vertical links 30 and 31 arranged in pairs and outside of the ends of a yoke 32 to which the upper ends of these links are pivoted as indicated in Figure 2 of the drawings. The center of the yoke 32 is pivoted as indicated by the numeral 33 to a member 34 on a longitudinal member of the chassis frame 5 as shown in Figure 2 of the drawings. Axle spacing links 34 and 35 have their front and rear ends pivoted to eyes on the adjacent sides of the webs of the axles, whereby the axles are held in parallelism but afforded sufficiently complete independent action provided by the independent springing produced by the spring structure described. A compensator bar 36 is attached at its rear end to an eye 37 on the front side of the front axle 17 and this is internally threaded at its front end as indicated by the numeral 38 and threaded in this portion is a threaded bar 39 which is pivoted horizontally as indicated by the numeral 40 on a block 41 attached to the cross brace 42 of the chassis frame. This compensator may be longitudinally adjusted to provide for the proper relation of the axles to the chassis frame.

The steering rod 43 whose front end is attached to suitable means on the front of the trailer or on the tractor vehicle to impart the correct steering angle to the wheels of the mechanism being described passes through a sleeve 44 in the cross member 42 and under the front cross member 6 and connects to the arm 46 as indicated by the numeral 45 which has a lateral arm 47 connected as indicated by the numeral 48 with the drag link 49 whose opposite end is pivoted flexibly as indicated by the numeral 50 to an arm of the tie rod 51 which extends between the steering arms 52 and 53 which are fixed on the wheel assemblies 54 and 55. The wheel assembly 54 has an additional arm 56 which extends forwardly and laterally inwardly and has flexibly pivoted thereto the front end of the drag link 57 which has its rear end flexibly and pivotally connected to a similar arm 58 on the wheel assembly 59. The wheel assembly 59 has a steering arm 60 which has the corresponding end of the link 61 pivotally and flexibly connected thereto, the said link 61 having its opposite end flexibly connected as indicated by the numeral 62 to the steering arm 63 on the wheel assembly 64. By means of the arrangements described, the operation of the steering arm 46 by the operating rod 43 will cause the wheel assemblies to move in unison and to the same amount on the pivots of their kingpins.

A steering stabilizer bar 65 extends forwardly from the vertical shaft to which the arms 46 and 47 are connected and this has its front end attached to oppositely acting springs 66 and 67 which take up any tendency of the wheels to wander through slackness in the steering mechanism.

The invention is adapted also to incorporation in a trailer which involves front wheel arrangement, in which instance the steering control or operating arm 43 would be connected to the front steering mechanism whereby the front steering mechanism would control the operation of the rear truck described herein.

Although I have shown and described herein a preferred embodiment of my invention, it is to be definitely understood that I do not desire to limit the application of the invention thereto, and any change or changes may be made in the structure and arrangement of the parts, within the spirit of the invention and the scope of the subjoined claims.

What is claimed is:—

1. In a trailer, a chassis frame, a wheeled truck including a pair of axles, means holding said axles in relative parallelism, transversely spaced spring means connecting the axles to the chassis frame, each of said spring means including a pair of longitudinally aligned and longitudinally spaced leaf springs connected at their forward and rear ends respectively to the chassis frame, and a toggle link connection between the front end of the rear spring and the rear end of the front spring and comprising a pair of spaced parallel links connected at their opposite ends to the adjacent ends of said front and rear springs, a yoke pivotally suspended from the chassis and shackles pivotally connecting the ends of the yoke to the adjacent ends of said springs.

2. In a trailer, a chassis frame, a wheeled truck including a pair of axles, means holding said axles in relative parallelism, transversely spaced spring means connecting the axles to the chassis frame, each of said spring means including a pair of longitudinally aligned and longitudinally spaced leaf springs connected at their forward and rear ends respectively to the chassis frame, and a toggle link connection between the front end of the rear spring and the rear end of the front spring, said toggle linkage comprising an arcuate-shaped yoke pivoted intermediate its ends to the chassis, shackles pivotally connecting the ends of the yoke to the adjacent ends of said springs and links also connecting the adjacent ends of the springs.

3. In a trailer, a chassis frame, a wheeled truck including a pair of axles, means holding said axles in relative parallelism, transversely spaced spring means connecting the axles to the chassis frame, each of said spring means including a pair of longitudinally aligned and longitudinally spaced leaf springs connected at their forward and rear ends respectively to the chassis frame, and a toggle link connection between the front end of the rear spring and the rear end of the front spring, said connection comprising an arcuate-shaped yoke pivoted intermediate its ends to the chassis, shackles pivotally connecting the ends of the yoke to the adjacent ends of said springs and links also connecting the adjacent ends of said springs, and an adjustable axle coordinating connection between one of the axles and the chassis frame and extending longitudinally relative to the chassis frame.

CHARLES RUNYAN.